United States Patent [19]

Kurata

[11] Patent Number: 4,805,337
[45] Date of Patent: Feb. 21, 1989

[54] FISH SONAR BODY

[75] Inventor: Hisao Kurata, Aichi, Japan

[73] Assignee: Honda Electric Co., Ltd., Aichi, Japan

[21] Appl. No.: 111,216

[22] Filed: Oct. 22, 1987

[30] Foreign Application Priority Data

May 13, 1987 [JP] Japan ............................. 62-71300[U]

[51] Int. Cl.$^4$ ............................................. A01K 97/12
[52] U.S. Cl. ....................................... 43/17.5; 43/17.1
[58] Field of Search ........................ 43/17.1, 17.5, 26.1

[56] References Cited

U.S. PATENT DOCUMENTS

| | | | |
|---|---|---|---|
| 3,879,697 | 4/1975 | Richard | 43/17.1 |
| 3,885,338 | 5/1975 | York | 43/17.1 |
| 4,161,077 | 7/1979 | Ciaccio et al. | 43/26.1 |
| 4,253,165 | 2/1981 | Christiansen | 43/26.1 |
| 4,339,888 | 7/1982 | Sheng-Jung | 43/26.1 |
| 4,384,425 | 5/1983 | Lemans | 43/17.5 |
| 4,422,258 | 12/1983 | Adams et al. | 43/17.5 |
| 4,437,256 | 3/1984 | Kulak | 43/17.5 |
| 4,635,391 | 1/1987 | Early | 43/26.1 |

Primary Examiner—M. Jordan
Attorney, Agent, or Firm—Burgess, Ryan & Wayne

[57] ABSTRACT

A fish sonar buoy is stayed on the surface of the water apart from a boat or shore, ultrasonic signals is emitted from a transmitter-receiver in the water, ultrasonic echo signals in the water are converted to electric signals in the transmitter-receiver, the electric signals are taken in a control circuit during a desired time after ultrasonic signals are emitted from the transmitter-receiver, and thus, a school of fish in the desired position below the water level is detected by a signal information device.

15 Claims, 7 Drawing Sheets

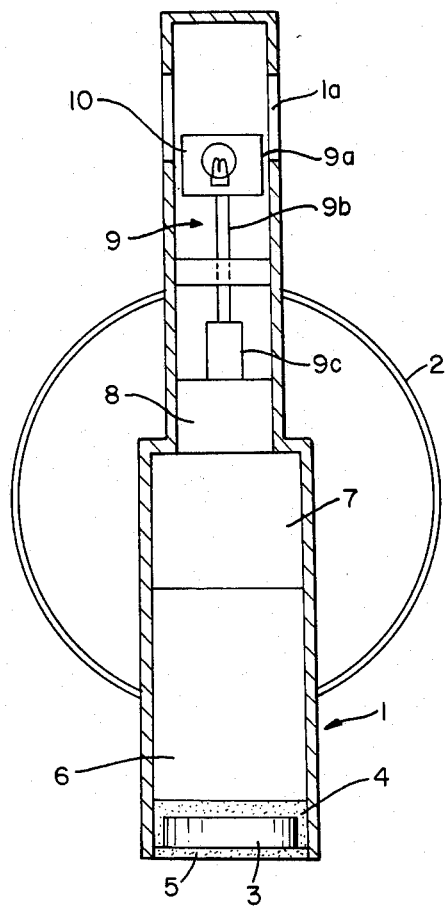
F I G. 1

FISH SONAR BODY

BACKGROUND OF THE INVENTION

The present invention relates to a fish sonar buoy for detecting a school of fish in a desired deep portion in the sea.

Generally, a fish sonar is well known in which an ultrasonic transducer is provided with the bottom or side of a fishing boat. In the fish sonar, the ultrasonic signal is emitted from the ultrasonic transducer, the ultrasonic echo signals being reflected from schools of fish, the bottom and so on in the sea, are received again and transformed into electric signals by the ultrasonic transducer. The electric signals are processed by a receiving circuit and are displayed on a cathode ray tube or recorded by a recorder.

A condition near or below the fishing boat is detected by the prior fish sonar, but a condition in the sea apart from the fishing boat cannot be detected. Therefore, when the angler fishes by mooring a boat, he must move the fishing boat for detecting a condition in the sea apart from the fishing boat. Also, the same occurs when an angler fishes with a fishing rod in a quay, a condition in the sea where a fish-hook is cast is not detected by a prior fish sonar.

SUMMARY OF THE INVENTION

It is, therefore, the primary object of the present invention to provide a small fish sonar buoy with a simple construction.

It is another object of the present invention to provide a fish sonar buoy for displaying or warning whether fish exist in a desired deep portion or not.

It is a further object of the present invention to provide a fish sonar buoy for providing a warning condition in a distant desired deep portion under the water surface.

In order to accomplish the above and other objects, the present invention provides a fish sonar buoy having a transmitting circuit for transmitting pulse signals, a transmitter-receiver for transmitting ultrasonic according to the pulse signals in the water, the transmitter-receiver being mounted in a bottom portion thereof, a receiving circuit having a control circuit for taking in the echo signals converted by the transmitter-receiver during a desired time and for generating electric signals, and a signal information device for informing a existence of a school of fishes in a desired deep portion by a change of a color or an emission of a light or sound.

BRIEF DESCRIPTION OF THE DRAWINGS

FIG. 1 shows a side section view of a fish sonar buoy according to an embodiment of the present invention.

DESCRIPTION OF THE PREFERRED EMBODIMENTS

Figure 4:
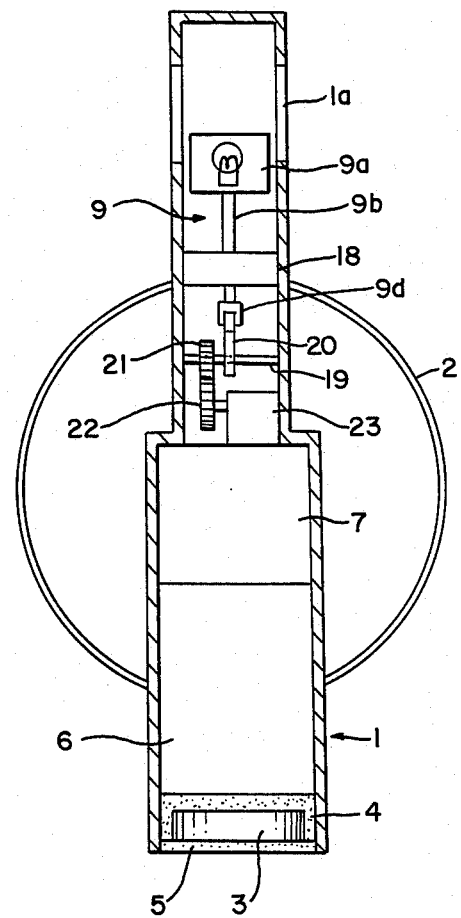
FIG. 4 shows a side section view of a fish sonar buoy according to another embodiment of the present invention.

Referring to FIG. 1, a buoy member 1 has a float member 2, and an ultrasonic transmitter-receiver 3 is enclosed in the bottom portion of the buoy member by an elastic member 4 of foamed plastic so that the the ultrasonic signals from the transmitter-receiver do not leak from the side of the buoy member. An elastic member of a sheet of rubber is formed on the surface of the portion emitting ultrasonic. A power supply 6 having batteries is mounted on the elastic member 4 of the buoy 1. Though not shown in the drawings, the batteries of the power supply 6 are changed by opening a cover or one portion of the buoy member 1 is changed with the batteries of the power supply 6. In the buoy member 1, a transmitting-receiving circuit 7 is mounted on the power supply 6 and an electric solenoid 8 is mounted on the transmitting-receiving circuit 7 and is driven by the signals from the transmitting-receiving circuit 7. A display member 9 is mounted on the electric solenoid 8 and has a display portion 9a colored by red, black and yellow. The display portion 9a is positioned near a window portion 1a of the buoy member 1. A luminous body 10 of an electric lamp, a light emitting diode and the like is provided with the display member 9. A magnet 9c is fixed in the shaft 9b under the display member 9 and is positioned on the solenoid 8.

Figure 2:
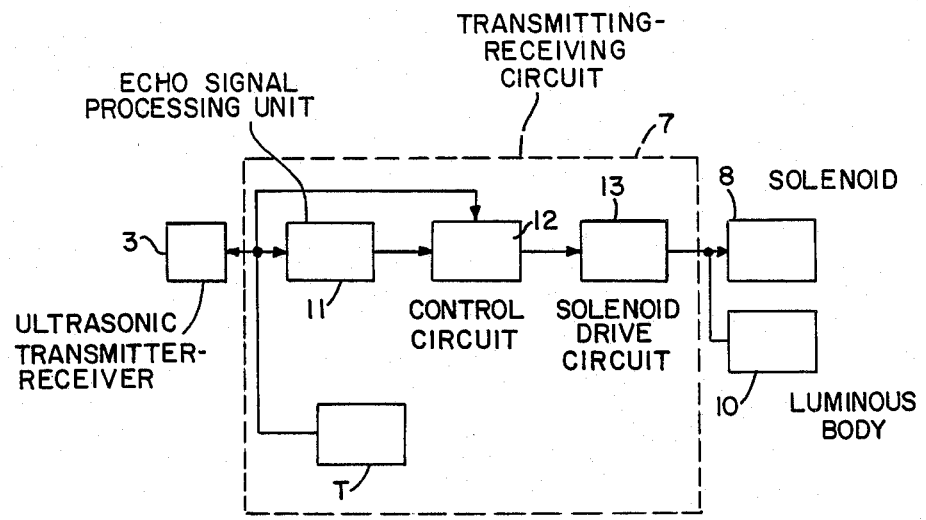
FIG. 2 shows a block diagram for moving a display member of the fish sonar buoy in FIG. 1.
Figure 3:
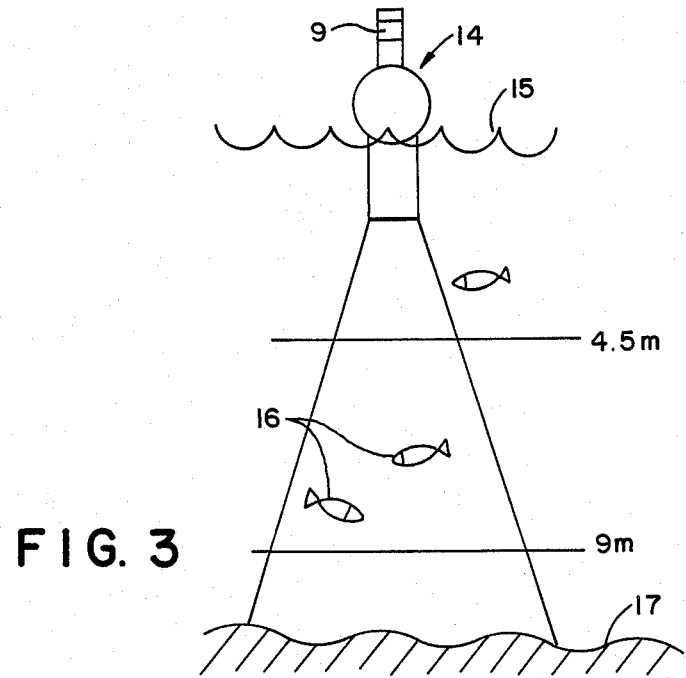
FIG. 3 shows a condition using the fish sonar buoy in the present invention.

FIG. 2 shows a drive circuit of the fish sonar buoy in FIG. 1. In FIG. 2, the ultrasonic signals transmitted from the ultrasonic transmitting-receiving circuit 3 to the water according to the pulse signals of the transmitter T returns to the transmitting-receiving circuit 3 as an echo. The echo signals from the transmitting-receiving circuit 3 are converted to electric signals in an echo signal processing unit 11 of a transmitting-receiving circuit 7. The converted electric signals are applied to a solenoid drive circuit 13 through a control circuit 12 having a CPU (Central processing unit). The electric current from the solenoid drive circuit 13 is intermittently applied to the solenoid 8. When the electric current is applied to the solenoid 8, the magnet 9c of the display member 9 is repelled by the magnetic flux of the solenoid 8 and the display portion 9a of the display member 9 is looked on the window portion 1a. Then the electric current is applied from the solenoid drive circuit 13 to the luminous body 10 and the display portion 9a is luminous according to the turn-on and turn-off of the luminous body 10.

When a fish sonar body 14 formed as shown above floats on the water surface 15, the ultrasonic signals are emitted from the ultrasonic transmitter-receiver 3 to the water in constant time. When a desired time (e.g. 3/1000 seconds) elapses after the ultrasonic signals are emitted, the echo signals from the transmitter-receiver 3 are taken in the control circuit 12 during a desired time (e.g. 3/1000 seconds). Thereby, when a school of fish exist between 4.5 m to 9 m deep, the ultrasonic echoes are received in the transmitter-receiver 3 between 3/1000 second. When the ultrasonic signals are received by the transmitter-receiver 3, the display member 9 is vibrated up and down by the solenoid drive circuuit 13. Therefore, it is able to detect that a school of fish exist 4.5 m to 9 m deep in the upper portion of the bottom 17 of the water. The display portion 9a of the display member 9 is not vibrated when fish do not exist. The time for taking in the echo signals in the control circuit is set arbitrarily. For example, this time may be set to take in the echo signals during the surface and bottom of the water in the control circuit 12.

FIG. 4 shows a side section view of a fish sonar buoy according to the another embodiment of the present invention. 1 shows a buoy member, 2; a float member, 3; an ultrasonic transmitter-receiver, 4; an elastic member, 5; a sheet-like elastic member, 6; a power supply, and 7; a transmitting-receiving circuit and these constructions are the same as in FIG. 1. In this embodiment, a luminous body 10 is provided with the display portion 9a of the display member 9 and the shaft 9b is supported on a supporting member 18 to be able to shift up and down. A roller 9d is provided in the lower portion of the shaft 9c and is contacted with a cam 20 fixed on a rotary shaft 19 which is supported in the buoy member 1. Also, a gear 21 is fixed on rotary shaft 19 and is engaged with a gear 22 fixed to the shaft of the motor 23.

Figure 5:
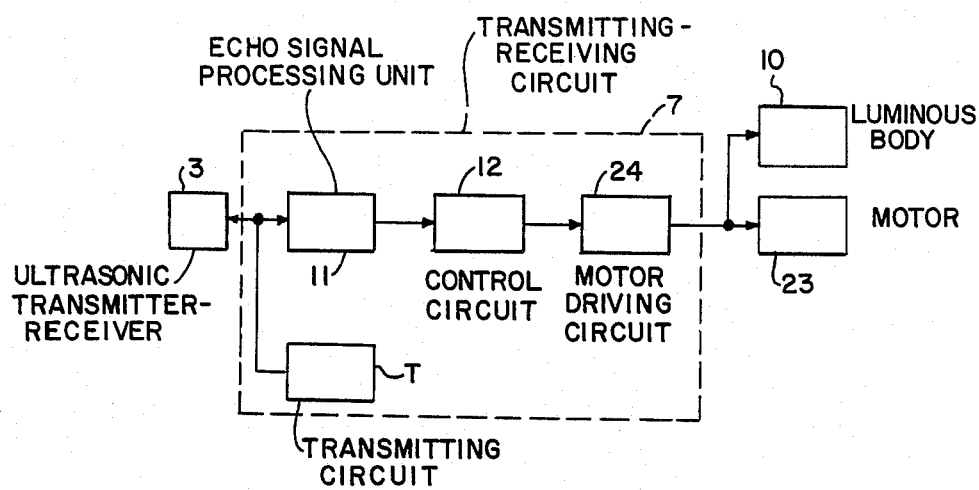
FIG. 5 shows a block diagram used in the fish sonar buoy in FIG. 4.

FIG. 5 shows a block diagram of a driving circuit for driving the fish sonar buoy. T shows a transmitting circuit, 3; an ultrasonic transmitter-receiver, 7; a transmitting-receiving circuit, and 11; an echo signal processing unit. Electric signals converted by an echo signal processing unit 11 are taken in the control circuit 12 and when a school of fish exist at the lower portion of the fish sonar buoy, the driving signal is applied from a motor driving circuit 24 to a motor 23, the motor 23 is rotated, thus the gears 21 and 22 are rotated by the motor 23, the cam 20 is rotated and then the display member 9 is driven and displayed. Also, the luminous body 10 is luminous by supplying electric current.

Figure 7:
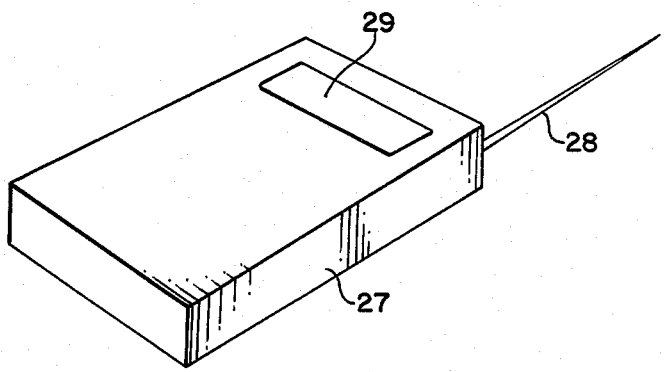
FIG. 7 shows a perspective view receiver used in the fish sonar buoy of FIG. 6.
Figure 6:
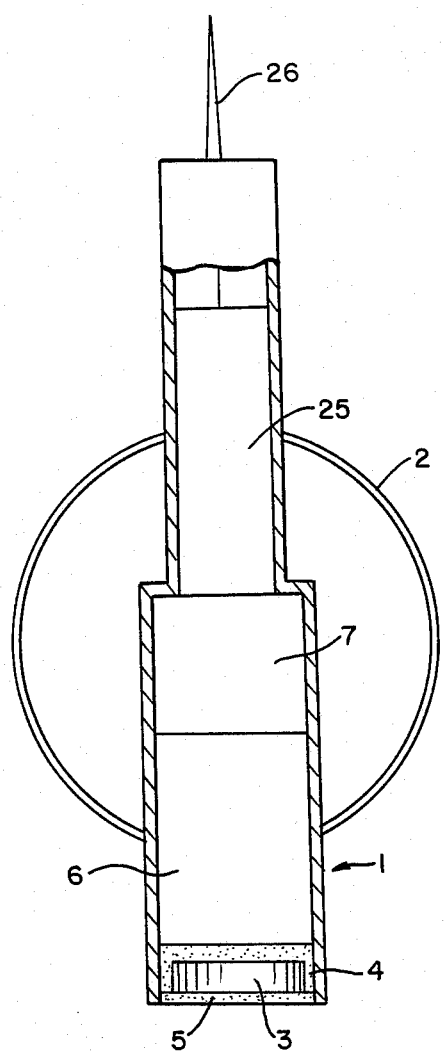
FIG. 6 shows a side section view of a fish sonar buoy according to another embodiment of the present invention.

FIG. 6 shows a side section view of a fish sonar buoy according to another embodiment of the present invention. 1 shows a buoy member, 2; a float member, 3; an ultrasonic transmitter-receiver, 4; an elastic member, 5; a sheet-like elastic member, 6; a power supply, and 7; a transmitting-receiving circuit and these constructions are the same as in FIG. 1. In FIG. 6, an RF converting circuit 25 for converting the output to RF signals of the transmitting-receiving circuit 7 is provided with the upper portion of the buoy member 1. The RF signals converted by the RF converting circuit 25 are transmitted through an antenna 26 as a radio wave. The radio wave signals are received by an antenna 28 of a receiver 27 as shown in FIG. 7, and a luminous body 29 of the receiver 27 is turned on or off when fish exist in the water.

Figure 8A:
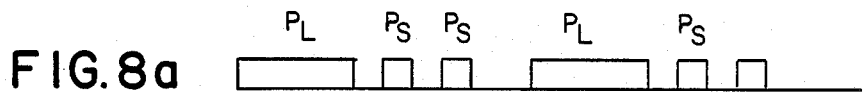
FIGS. 8(a) and (b) show wave forms of pulse signals.
Figure 8B:
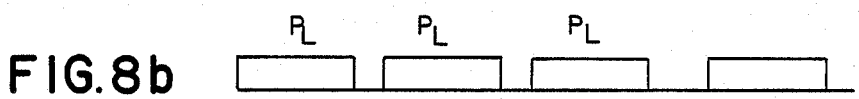

For example, in the RF signals, if a long pulse signal shows 5 meters and a short pulse signal, 1 meter, the pulses in FIG. 8(a) have one long pulse $P_L$ and two short pulses $P_S$ and thus show 7 meters. Also, the pulses in FIG. 8(b) have three long pulses $P_L$ and thus show 15 meters. When these long pulses $P_L$ and short pulses $P_S$ are applied to the fish sonar buoy of FIG. 6, these long pulses $P_L$ and short pulses $P_S$ are received by the receiver 27 and the depth at which fish are detected are informed by the turn on or off of the luminous body.

Figure 9:
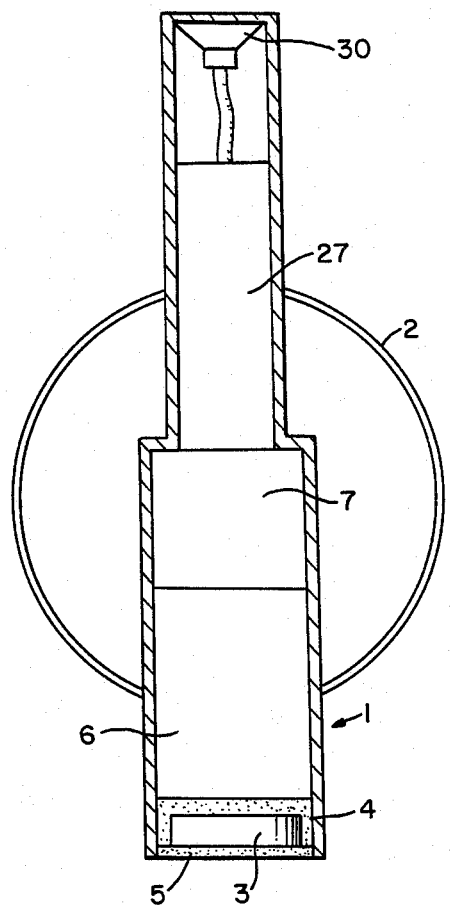
FIG. 9 shows a side section view of a fish sonar buoy according to another embodiment of the present invention.

FIG. 9 shows a side section view of a fish sonar buoy according to another embodiment of the present invention. 1 shows a buoy member, 2; a float member, 3; an ultrasonic transmitter-receiver, 4; an elastic member, 5; a sheet-like elastic member, 6; a power supply, and 7; a transmitting-receiving circuit and these constructions are the same as in FIG. 1. In FIG. 9, a signal generating device 30 is provided with the upper portion of the transmitting-receiving circuit 7 and a speaker 31 is provided with the upper portion of the buoy member 1. The signals from the transmitting-receiving circuit 7 are converted to the combination signals of the long pulses $P_L$ and the short pulses $P_S$ in the signal generating device 30. Therefore, intermittent sound is generated from the speaker 31 by the long pulses $P_L$ and the short pulses $P_S$ and the depth of fish is informed by the meter.

Also, the combination signals of the long pulses $P_L$ and the short pulses $P_S$ are used in the fish sonar buoy of FIG. 1 and the depth of fish is informed by the turn on and off of the luminous body 10. In FIG. 9, a buzzer may be used instead of the speaker.

Figure 10:
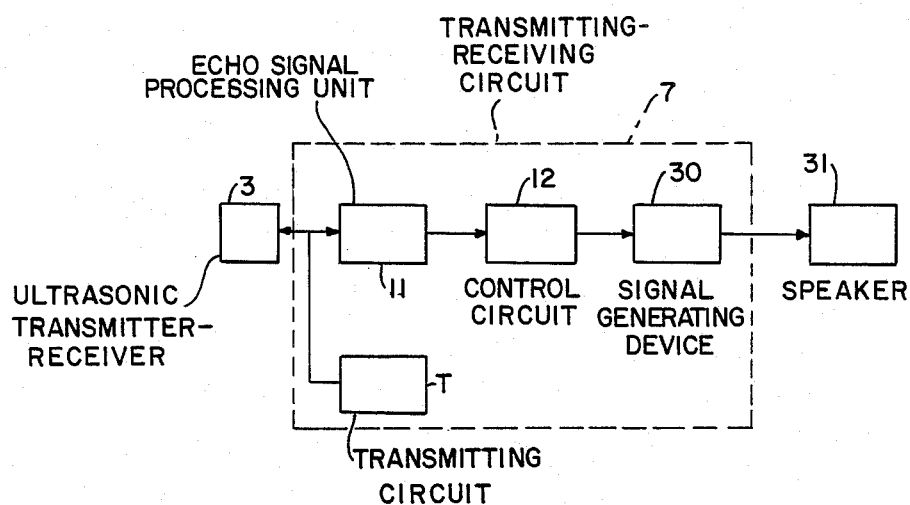
FIG. 10 shows a block diagram used in the fish sonar buoy of FIG. 9.

FIG. 10 shows a block diagram of a driving circuit for driving the fish sonar buoy. T shows the transmitting circuit, 3; an ultrasonic transmitter-receiver, 7; a transmitting-receiving circuit, and 11; an echo signal processing unit and these constructions are the same as in FIG. 2. The signals from the control circuit 12 are applied to the signal generating circuit 30 and the combination signals of the long pulses $P_L$ and the short pulses $P_S$ is applied from the signal generating circuit 30 to the speaker 31 so that the depth of fish is informed by long and short sounds from the speaker 31.

What is claimed is:

1. A fish sonar buoy having a transmitting circuit for transmitting pulse signals, a transmitter-receiver for transmitting ultrasonic signals according to the pulse signals in water, the transmitter-receiver being mounted in a bottom portion of said buoy, a receiving circuit having a control circuit for receiving echo signals converted by the transmitter-receiver during a desired time after the ultrasonic signals are emitted and for generating electric signals, and a signal information device for informing the existence of a school of fish in a desired deep portion of the water according to the desired time by a change of a color or an emission of a light or sound, wherein the signal information device includes an information body driven by a solenoid.

2. A fish sonar buoy according to claim 1 wherein the information body of the signal information device has a luminous body.

3. A fish sonar buoy according to claim 2 wherein the luminous body is a lamp.

4. A fish sonar buoy according to claim 2 wherein the luminous body is a light emitting diode.

5. A fish sonar buoy according to claim 1 wherein the information body of the signal information device has a sound generating device.

6. A fish sonar buoy according to claim 5 wherein the sound generating device is a speaker.

7. A fish sonar buoy according to claim 5 wherein the sound generating device is a buzzer.

8. A fish sonar buoy having a transmitting circuit for transmitting pulse signals, a transmitter-receiver for transmitting ultrasonic signals according to the pulse signals in the water, the transmitter-receiver being mounted in a bottom portion of said buoy, a receiving circuit having a control circuit for receiving echo signals converted by the transmitter-receiver during a desired time after the ultrasonic signals are emitted and for generating electric signals, and a signal information device for informing the existence of a school of fish in a desired deep portion of the water according to the desired time by a change of a color or an emission of a light or sound, wherein the the signal information device includes an information body driven by a motor.

9. A fish sonar buoy according to claim 8, wherein the information body of the signal information device has a luminous body.

10. A fish sonar buoy according to claim 9, wherein the luminous body is a lamp.

11. A fish sonar buoy according to claim 9, wherein the luminous body is a light emitting diode.

12. A fish sonar buoy according to claim 8, wherein the information body of the signal information device has a sound generating device.

13. A fish sonar buoy according to claim 12, wherein the sound generating device is a speaker.

14. A fish sonar buoy according to claim 12, wherein the sound generating device is a buzzer.

15. A fish sonar buoy having a transmitting circuit for transmitting pulse signals, a transmitter-receiver for transmitting ultrasonic signals according to the pulse signals in the water, the transmitter-receiver being mounted in a bottom portion of said buoy, a receiving circuit having a control circuit for receiving echo signals converted by the transmitter-receiver during a desired time after the ultrasonic signals are emitted and for generating electric signals including a combination of long pulse signals and short pulse signals, and a signal information device for informing the existence of a school of fish in a desired deep portion according to the desired time by a change of a color or an emission of a light or sound.

* * * * *